(12) United States Patent
Anonsen

(10) Patent No.: US 7,139,690 B2
(45) Date of Patent: Nov. 21, 2006

(54) OBJECT-LEVEL CONFLICT DETECTION IN AN OBJECT-RELATIONAL DATABASE SYSTEM

(75) Inventor: Steven P. Anonsen, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 10/201,551

(22) Filed: Jul. 22, 2002

(65) Prior Publication Data

US 2004/0015508 A1    Jan. 22, 2004

(51) Int. Cl.
*G06F 17/30* (2006.01)
*G06F 7/00* (2006.01)

(52) U.S. Cl. .................................. 703/8; 707/103 R

(58) Field of Classification Search ............... 707/1–6, 707/8, 10–104.1, 200–204, 229, 103 Y, 103 R; 709/203, 205, 217, 226

See application file for complete search history.

(56) References Cited

U.S. PATENT DOCUMENTS

| | | | | |
|---|---|---|---|---|
| 5,499,371 A | * | 3/1996 | Henninger et al. | 717/108 |
| 5,603,026 A | * | 2/1997 | Demers et al. | 707/8 |
| 5,671,407 A | * | 9/1997 | Demers et al. | 707/8 |
| 5,694,598 A | * | 12/1997 | Durand et al. | 707/103 R |
| 5,926,816 A | * | 7/1999 | Bauer et al. | 707/8 |
| 5,983,225 A | * | 11/1999 | Anfindsen | 707/8 |
| 6,058,401 A | * | 5/2000 | Stamos et al. | 707/201 |
| 6,098,078 A | * | 8/2000 | Gehani et al. | 707/203 |
| 6,175,837 B1 | * | 1/2001 | Sharma et al. | 707/103 Y |
| 6,240,414 B1 | * | 5/2001 | Beizer et al. | 707/8 |
| 6,374,252 B1 | * | 4/2002 | Althoff et al. | 707/102 |
| 6,456,995 B1 | * | 9/2002 | Salo et al. | 707/1 |
| 6,502,086 B1 | * | 12/2002 | Pratt | 707/1 |
| 6,591,295 B1 | * | 7/2003 | Diamond et al. | 709/217 |
| 6,598,059 B1 | * | 7/2003 | Vasudevan et al. | 707/203 |
| 6,684,215 B1 | * | 1/2004 | Saracco | 707/100 |
| 6,754,670 B1 | * | 6/2004 | Lindsay et al. | 707/100 |
| 2003/0187884 A1 | * | 10/2003 | Holenstein et al. | 707/202 |

OTHER PUBLICATIONS

Peter Graham et al.: Effective Optimistic Concurrency Control in Multiversion Object Bases, Jun. 1994, pub. by Springer-Verla pp. 315-328.*

Graham, P. et al., "Effective Optimistic Concurrency Control in Multiversion Object Bases," 16 pages (Jun. 28, 1994).*

* cited by examiner

*Primary Examiner*—Jeffrey Gaffin
*Assistant Examiner*—Jacques Veillard
(74) *Attorney, Agent, or Firm*—Westman, Champlin & Kelly, P.A.

(57) ABSTRACT

Object level conflict detection is provided. In an optimistic concurrency embodiment, when an object is to be updated, the database system is checked to determine whether any data related to fields of the object have changed since the object was read. This can be accomplished by storing a copy of the data when the initial object read function is performed and subsequently comparing the initial copy with the database data as it stands when the update is to be performed.

11 Claims, 4 Drawing Sheets

OBJECT-LEVEL CONFLICT DETECTION IN AN OBJECT-RELATIONAL DATABASE SYSTEM

BACKGROUND OF THE INVENTION

The present invention relates to database systems. More specifically, the present invention relates to conflict detection in an object-relational database system.

In conventional relational databases, all data are stored in named tables. The tables are described by their features. In other words, the rows of each table contain objects of identical type, and the definitions of the columns of the table (i.e., the column names and the data types stored in the column) describe the attributes of each of the instances of the object. By identifying its name, its column names and the data types of the column contents, a table is completely described.

Relational databases offer several advantages. Database queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties or attributes is not optimal in the classical relational data model. This can make such databases cumbersome in many applications.

Another recent technology for database systems is referred to as object oriented database systems. These systems offer more complex data types in order to overcome the restrictions of conventional relational databases. In the context of object oriented database models, an "object" includes both data and the functions (or methods) which can be applied to the object. Each object is a concrete instance of an object class defining the attributes and functions of all its instances. Each instance has its unique identifier by which it can be referred to in the database.

Object oriented databases operate under a number of principles. One such principle is referred to as inheritance. Inheritance means that new object classes can be derived from another class by inheritance. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein using methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by an object class, the application can still accommodate objects of the derived classes, because the objects in the derived classes inherit these methods. However, object oriented databases are not yet as widely used in commercial products as relational databases.

Yet another database technology attempts to combine the advantages of the wide acceptance of relational databases and the benefits of the object oriented paradigm. This technology is referred to as object-relational database systems. There are generally two variants of O-R systems: one adds the capabilities to the database management system itself; the other is external to the database and addresses the "impedance mismatch" between objects and relational tables. Unless and until objects run in the database, such systems will be necessary. Some of these databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the operations and functions associated with the new data type can be used to index, store, and retrieve records based on the content of the new data type.

In a multi-user environment, there are generally two types of approaches for detecting conflicts when updating data in a database. These are known as pessimistic concurrency and optimistic concurrency.

Pessimistic concurrency involves locking rows at the datasource to prevent users from modifying data in a way that affects other users. In a pessimistic model, when a user performs an action that causes a lock to be applied, other users cannot perform actions that would conflict with the lock until the lock owner releases it. This model is primarily used in environments where there is heavy contention for data, and/or where the cost of protecting data with locks is less than the cost of rolling back transactions if concurrency conflicts occur.

In a pessimistic concurrency model, a user who reads a row with the intention of changing it establishes a lock. Until the user has finished the update and released the lock, no one else can change that row. For this reason, pessimistic concurrency is usually implemented when lock times will be relatively short as in programmatic processing of records.

In contrast, optimistic concurrency does not lock a row when a user is reading it. When a first user wants to update data, the application generally determines whether another user has changed the affected data after the first user read the data, but before the first user attempted to update the row. Optimistic concurrency is generally used in environments with a low contention for data. This improves performance as no locking of records is required, and locking of records acquires additional server resources. Also, in order to maintain record locks, a persistent connection to the database server is generally required. Because this is not the case in an optimistic concurrency model, connections to the server are free to serve a larger number of clients in less amount of time. Another reason for optimistic concurrency in the world of the Internet is that connections cannot be held across a firewall.

Optimistic concurrency is typically effected using one of two common algorithms: row level conflict detection and column (or field level) conflict detection. In row level detection, if a row in a table has changed after the row has been read but before data is written to the row, a conflict is registered. This is normally achieved by checking a time stamp column, or comparing the existing values on the row with the original values in the row when the row was first read, to ensure that none of the values have changed. Column level detection determines if any of the columns, or fields, that were read and modified by a user have been changed (by another user) since they were read by the first user. If this occurs, a conflict is registered. This is achieved by comparing the original values of the changed columns. These known methods of managing conflicts within a multi-user database system do not adequately provide for efficient object-relational database use. The limitations of these approaches are illustrated in the following examples.

Column level detection is not always correct in that, in some cases, a real world conflict does in fact occur and is not detected by column level detection. If two columns are conceptually linked, users can still make independent simultaneous changes to each column without generating a conflict. For example, assume a bank has an account table with two columns: balance_in_savings, and balance_in_checking and an additional policy that if the aggregate of the savings and checking balances is above $10,000.00 that there is no account surcharge for doing transactions. Column level conflict detection would fail to detect conflict in the following case. Assume that Joe Smith has a checking balance of $999.00 and a savings balance of $9,000.00. Users A and B both read the Joe Smith entry containing these two balances. User A adds $2.00 to the savings balance and User B subtracts $2.00 from the checking balance. User B updates first, making the combined balance $9,997.00. However, User A thinks the ending balance is above $10,000.00 and accordingly does not assess a surcharge and updates. This is incorrect.

Row-level detection is always correct, but can reduce concurrency. This is especially problematic in object-relational databases where more than one object can be independently stored on the same row of a table. For example, where one row contains both user reference data (e.g. the customer address) and accumulators (e.g. customer activity over time in number of invoices, dollars, etc), updating reference data and updating accumulators at the same time is reasonable and should not generate a conflict. However, row-level conflict detection will register a conflict and prohibit simultaneous updates of such data.

Another limitation of current conflict detection is that it currently does not recognize changes to different tables as part of the same logical unit of work. For example, a change to an order in a table will not conflict with a change to an order line that is in a different table, order_line, but is part of the same order. Further, when an object includes fields for a class, which fields are mapped to columns of multiple tables, current conflict detection does not register conflicts even though users can be simultaneously modifying data for the same object.

Thus, using current conflict detection strategies with today's object-relational database systems will either not guarantee that conflicts are generated when they should be, or unduly reduce concurrency. Providing a solution to these problems would facilitate the widespread use of object-relational database systems in multi-user environments.

SUMMARY OF THE INVENTION

Object-level conflict detection is provided. In an optimistic concurrency embodiment, when an object ("also referred to as an entity") is to be updated, the database system consults a map relating the object fields to one or more table columns, which columns (or fields) are checked to determine whether any data therein have changed since the object was read. This can be accomplished by storing a copy of that data when the initial object read function is performed and subsequently comparing the initial copy with the data as it stands when the update is to be performed.

DETAILED DESCRIPTION OF ILLUSTRATIVE EMBODIMENTS

All embodiments of the present invention provide conflict detection at an object level. Three main embodiments are described: object-level optimistic concurrency by comparing individual field contents, object-level optimistic concurrency using table columns indicative of updates; and object-level pessimistic concurrency. These embodiments are primarily suited for multi-user object-relational database environments, but can be used in any object-relational database environment wherein data may be accessed by one or more users in one or more sessions.

Figure 1:
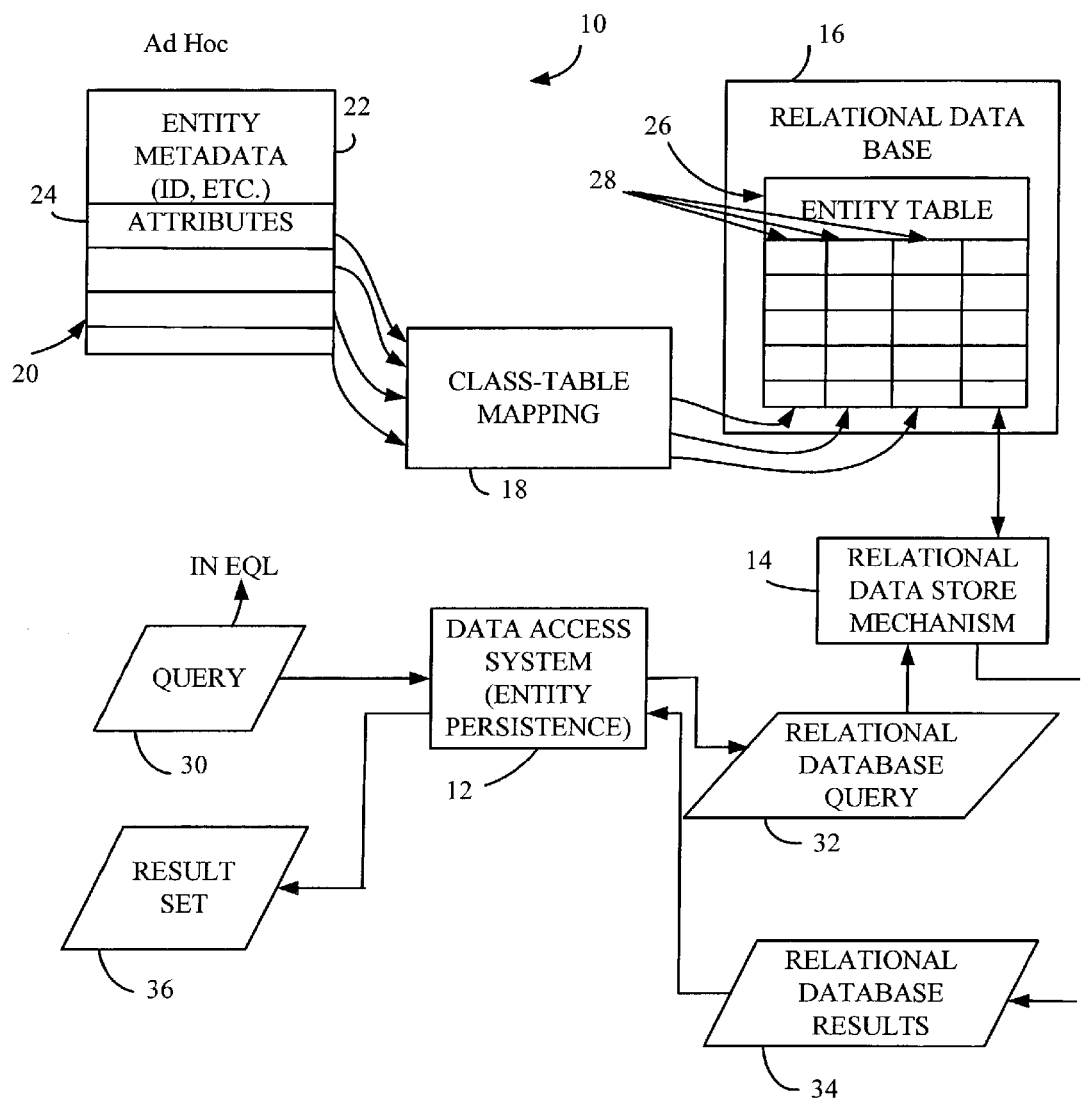
FIG. 1 is a block diagram of one embodiment of an object-relational data storage system.

FIG. 1 is a block diagram illustrating one embodiment of a data storage and accessing system 10 in which embodiments of the present invention are particularly useful. System 10 includes data access system (or object persistence system) 12, relational data store mechanism 14, relational database 16, and class-table mapping 18. System 10 is illustratively an object-relational (O-R) data storage system in which stored data can be referred to in terms of entities (or objects) and their properties, rather than elements of the database schema, such as tables and columns. FIG. 1 illustrates one mechanism for doing this.

As shown in FIG. 1, the data can be organized in terms of entities 20 (which is used interchangeably herein with the term objects). Each object illustratively includes a metadata portion 22 and a remaining attributes portion 24. The metadata portion 22 describes the object 20, while the remaining attributes 24 define further attributes of object 20, such as the data stored therein. Each of the attributes in object 20 is mapped to a corresponding object table 26 and a specific column 28 in a given object table 26.

Data access system 12 receives a query 30 which specifies an object, or portions of an object or group of objects, to be retrieved. Query 30 can illustratively be expressed in terms of objects or entities, rather than in terms of tables and columns.

In any case, data access system 12 receives the query 30 and accesses class-table mapping 18. In this way, data access system 12 can determine the location of the data for the entities identified by query 30. Data access system 12 then translates query 30 into a relational database query 32 which is suitable for input to relational data store mechanism 14. In one illustrative embodiment, relational data store mechanism 14 is a SQL server that accesses a SQL relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Figure 2:
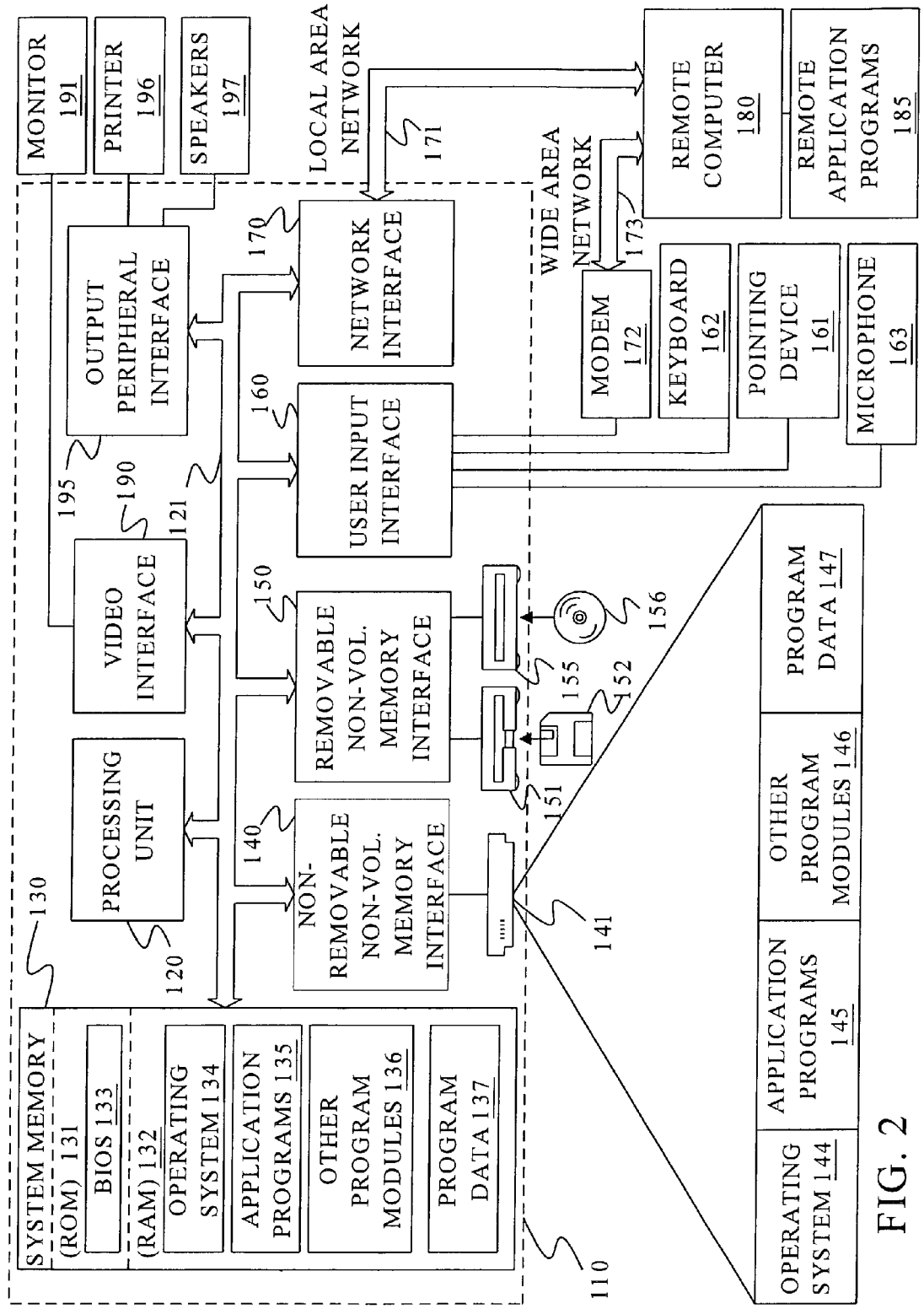
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

Figure 3:
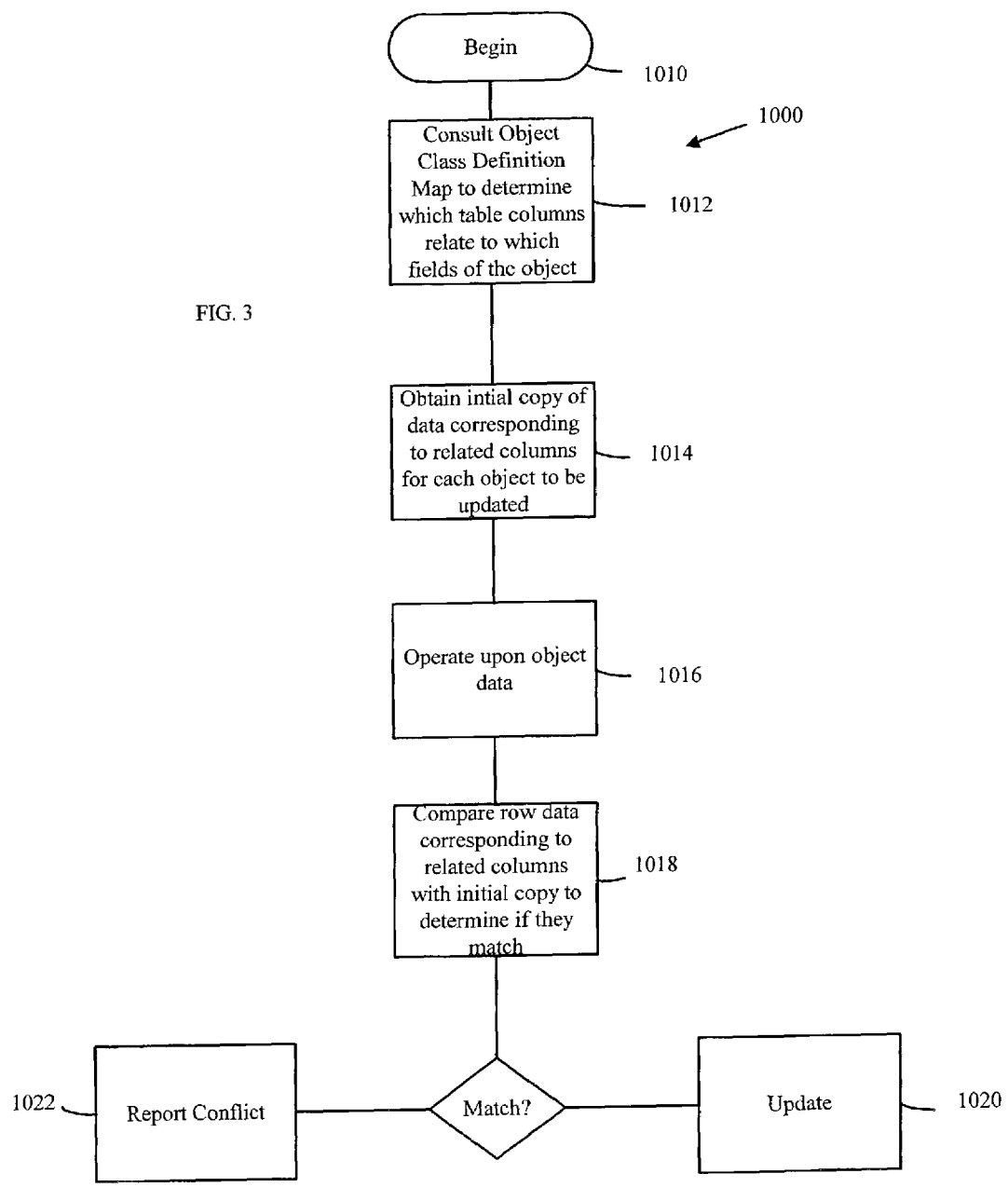
FIG. 3 is a flow diagram of a method of updating an object in an object-relational database system using an optimistic concurrency approach to object-level conflict detection, in accordance with an embodiment of the present invention.

FIG. 3 illustrates a method for updating an object in an object-relational database system using optimistic concurrency and comparing field data. Method 1000 begins at step 1010 where an update is desired to one or more objects. At step 1012, class-table mapping 18 for object 20 is consulted to determine which table columns 28 relate to which fields of object 20. At step 1014, an initial copy of the data corresponding to the related columns for each object to be updated is obtained. Since the data obtained corresponds to each of the fields of the object to be updated, one manner in which the data can be copied is to instantiate an object of the same class and populate that object with the initial data. However, many other suitable techniques can be used for storing the initial data. For example, users may "copy on write"—if a value is changed the original value is saved first.

At step 1016, the data of the object(s) is operated upon and modified to some degree. Control then passes to block 1018 where the row data corresponding the related columns of the table are consulted again and compared with the initial copy of data to determine if they match. This operation is preferably implemented in a single database statement and executed in the database server. A match indicates that no changes to data corresponding to the object at hand have taken place in the time between first reading the data for the object and completion of data operations for the object. Thus, if a match is observed, then the object can be updated and success reported, as indicated at block 1020. However, if any of the data do not match the initial copy, indicative of some other user or process changing data of the object while step 1000 processed, the update step must fail and the method reports a conflict as indicated at block 1022.

Figure 4:
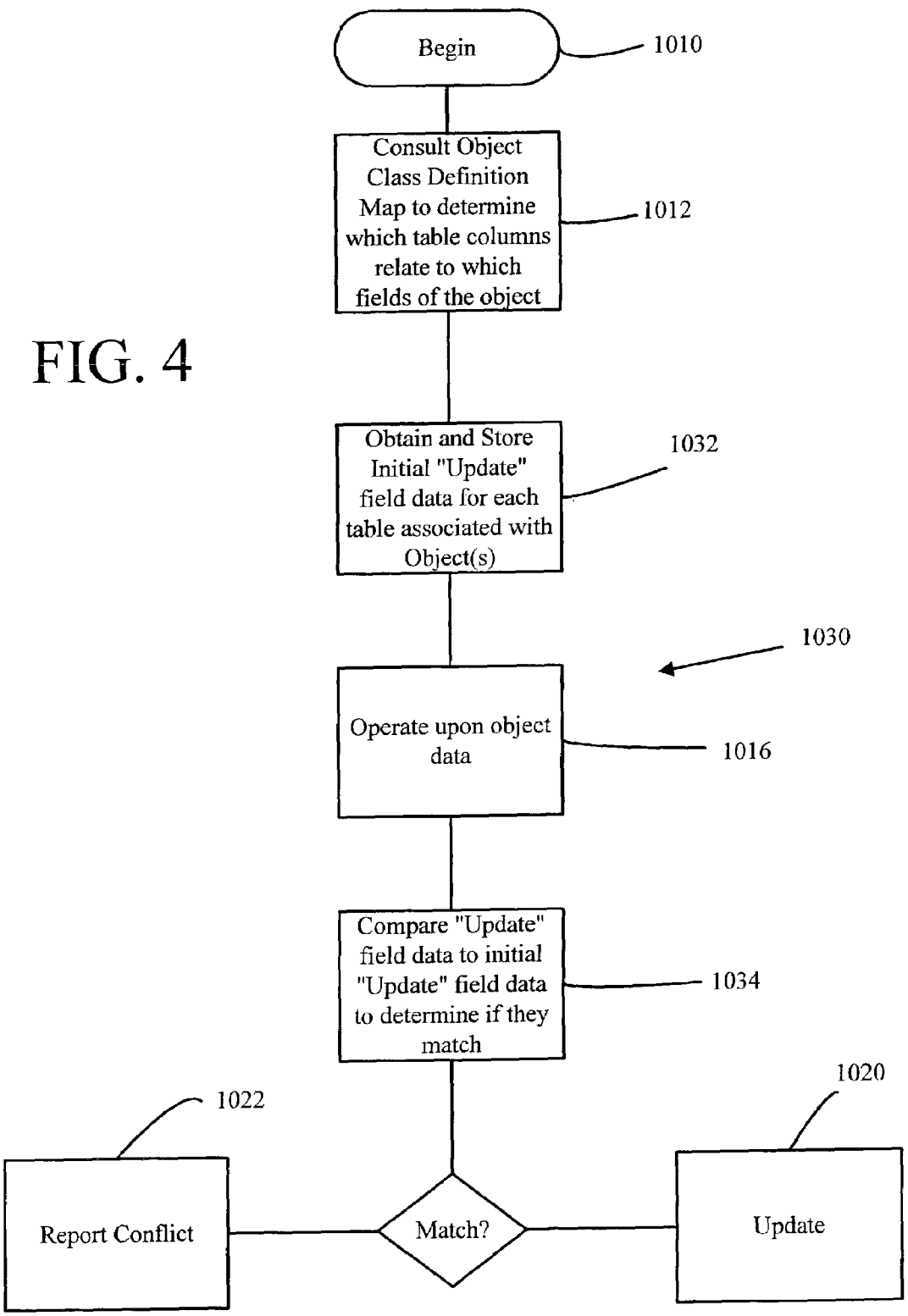
FIG. 4 is an alternate method of updating one or more objects in an object-relational database system using an alternate form of optimistic concurrency, in accordance with another embodiment of the present invention.

FIG. 4 is a flow diagram of a preferred implementation of conflict detection using optimistic concurrency in an object-relational database system. Method 1030 is somewhat similar to method 1000 described (with respect to FIG. 3) and like steps are numbered similarly. The primary difference between method 1030 and method 1000 is the inclusion of steps 1032 and 1034 in method 1030. Specifically, at step 1032, instead of obtaining an initial copy of all data related to the fields of the object, an "update" column corresponding to the selected object(s) is stored. Conventional databases often provide such a "update" field in the form of a time stamp that is written to every time the row is updated, thus providing a simplified row-level conflict detection system. However, when more than one object is stored in a row, it is necessary to use separate "update" columns for each object. This approach is not limited to the use of a timestamp and any suitable non-repeating regime can be employed. Moreover, since the data corresponding to the selected object may span multiple tables, this method requires that each table providing data relevant to the object also incorporate an "update" field. This is particularly advantageous in situations where the object may contain a substantial number of data fields disposed in a relatively small number of tables. Thus, for each object, the system need not compare each and every data field with an initial copy, such as set forth with respect to FIG. 3, but need simply to determine if the "update" field has changed. Thus, step 1034 simply changes this compare operation from that with respect to FIG. 3 to reviewing an initial copy of the "update" field with a copy that exists at the time that the update operation is desired. If the update field(s) match, then step 1020 executes and the object is updated successfully. However, if the "update" fields do not match, then the update fails and a conflict is reported as indicated at step 1022.

Operation of the above-identified optimistic concurrency embodiments is illustrated with the following example. A customer table includes a Customer and a CustomerActivity business object stored on it. To elaborate, consider the following two classes.

```
class Customer{
    public string ID;
    public string Name;
    public string Address;
}
class CustomerActivtiy{
    public string CustomerID;
    public decimal OnOrderAmount;
    public decimal LifetimeOrdersTaken;
}
```

They are mapped to the Cust_Info table as follows:
Cust_Info.Cust_ID Customer.ID
Cust_Info.Cust_Name Customer.Name
Cust_Info.Addr Customer.Address
Cust_Info.Cust_ID CustomerActivity.CustomerID
Cust_Info.On_Order CustomerActivity.OnOrderAmount
Cust_Info.Life_Orders CustomerActivity.LifetimeOrdersTaken Both objects map to the same table, but different columns (with the exception of the customer ID). When updating a customer, the system checks to determine if any of the columns (or fields) mapped to the customer have changed. If such columns (or fields) have in fact changed, conflict is detected and reported. This same approach is used for CustomerActivity or any other object. Thus, the following sequence of events can occur:
1. User A reads Customer "John Doe"
2. User B reads CustomerActivity for "John Doe"
3. User A changes John Doe's address
4. User B increments John Doe's LifetimeOrders and amount on order
5. User B saves: the row has not changed so no conflict occurs
6. User A saves: the row has actually changed, but none of the changes conflict with the fields in Customer, so the update for User A succeeds. In this manner, the developer has provided an indication that the columns for Customer were not necessarily tied to the columns for CustomerActivity by managing them as different objects. Thus, the original problem of row-level level optimistic concurrency locking entire rows has been obviated with the implementation of the object-level optimistic concurrency. Additionally, object-level conflict detection also avoids all limitations of previous column-level conflict detection by letting the developer group related fields into one class thereby indicating that the such fields are linked. For example, the columns in the bank account example given above would be placed together in a class:

```
Class BankAccount {
    public string ID;
    public decimal SavingsBalance;
    public decimal CheckingBalance;
}
```

Thus, if one user changed the SavingsBalance of a given Customer and the other changed the CheckingBalance, the last one to save would receive a conflict notification.

While the above-described embodiments can be considered object-level optimistic concurrency conflict detection in an object-relational database system, the invention is not limited to optimistic concurrency embodiments. While pessimistic concurrency in the context of embodiments of the present invention really does not add significant advantages, in fact it may indeed add disadvantages, the invention contemplates, and includes pessimistic concurrency embodiments.

In conclusion, embodiments of the present invention provide conflict detection in an object-relational database system at the object or entity level. Preferred embodiments include various methods of optimistic concurrency. Additionally, the present invention includes pessimistic concurrency.

Although the present invention has been described with reference to particular embodiments, workers skilled in the art will recognize that changes may be made in form and detail without departing from the spirit and scope of the invention. For example, while the methods of updating the object have been described relatively separate from the object descriptions, the update method can be a method of the object itself. Additionally, there are a number of ways that the initial data can be stored.

What is claimed is:

1. A method of conducting conflict detection and updating an object in an object-relational database, the method including steps of:
    accessing a class-table map that relates each field of the object to a corresponding column of a table in a database;
    conducting conflict detection by checking that database data corresponding to each field of the object is unchanged during execution of the method, wherein the step of checking is done using optimistic concurrency conflict detection; and
    selectively updating the object with updated data corresponding to at least one field in the corresponding column of the table after the step of checking.

2. The method of claim 1, wherein the step of checking includes a first read operation wherein only contents of at I least one table corresponding to the object are read and stored as initial condition data, and wherein prior to selectively writing the updated data, contents of the table corresponding to the object are read again and compared with the initial condition data.

3. The method of claim 2, wherein the method is performed as part of a single database statement.

4. The method of claim 1, wherein the step of checking includes reading a separate "update" column in the table, corresponding to the object, and storing an initial value of the update column, and wherein prior to selectively writing the updated data, the update column of the table is read again and compared to the initial value.

5. The method of claim 1, wherein the object is of a first class, and wherein the table includes columns corresponding to the first class and to a different class.

6. The method of claim 1, wherein the object includes a plurality of fields, and wherein the class map relates a first field of the plurality of fields to a column in a first table, and a second field of the plurality of fields to a column in a second table.

7. The method of claim 1, wherein the method is executed for a plurality of objects.

8. The method of claim 1, wherein the object-relational database system is embodied in a multi-user environment.

9. The method of claim 1, wherein the method is a method of the object.

10. An object-relational database system including a component for conducting conflict detection, wherein the system comprises
- a relational database;
- a class map that relates a first field of an object to at least a column in a first table within the relational database, and a second field of the object to a column in a second table within the relational database;
- a data access system adapted to receive a request to update the object, wherein the class map is consulted to identify at least one of the column in the first table and the column in the second table; and
- a conflict detection component adapted to ensure that data in the relational database is unchanged during the period between receiving the request, and updating the object.

11. A method of providing conflict detection in an object-relational database, the method comprising:
- accessing a class-table map that relates each field of an object to a column of a table in a database;
- checking to determine if database data corresponding to any field of the object has changed during execution of the method, wherein the step of checking is done using optimistic concurrency conflict detection; and
- providing a conflict indication if database data corresponding to any field of tile object has changed during execution of the method.

* * * * *